April 28, 1925.
C. NIELSEN, JR
1,536,029
SHUTTER APPARATUS FOR RADIATORS
Filed March 22, 1924
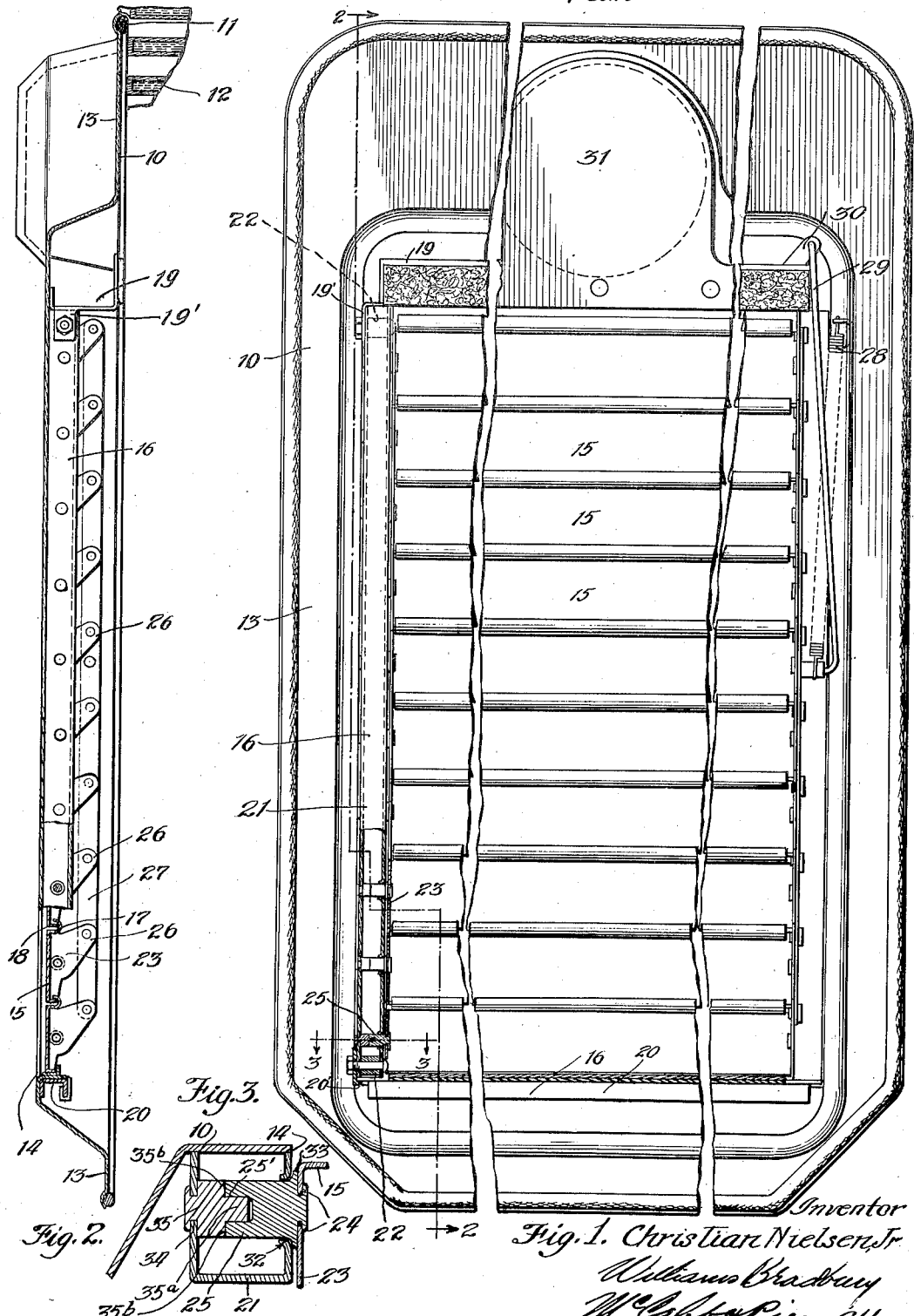

Patented Apr. 28, 1925.

1,536,029

UNITED STATES PATENT OFFICE.

CHRISTIAN NIELSEN, JR., OF CHICAGO, ILLINOIS.

SHUTTER APPARATUS FOR RADIATORS.

Application filed March 22, 1924. Serial No. 700,987.

*To all whom it may concern:*

Be it known that I, CHRISTIAN NIELSEN, Jr., a citizen of the United States, and resident of Chicago, in the county of Cook and State of Illinois, have invented a certain new and useful Improvement in Shutter Apparatus for Radiators, of which the following is a full, clear, concise, and exact description, reference being had to the accompanying drawings, forming a part of this specification.

My invention relates to a shutter apparatus usable in conjunction with the radiator of an internal combustion engine and is particularly adaptable for use in a thermostatically controlled shutter apparatus wherein the more delicate actuating means require shutter bearings having a minimum of friction.

The specific shutter apparatus herein shown is of the general type described and claimed in Patent No. 1,458,593, issued June 12, 1923, to James F. Raleigh, to which patent reference may be had for a detailed description of certain desirable features of shutter apparatus construction which I prefer to employ, but with which my present invention is not particularly concerned.

This invention is chiefly concerned with improvements in the shutter frame and shutter bearings, one object being to provide the shutter with dustproof bearings which will not stick or be subject to undue wear because of foreign matter finding its way between the relatively moving parts of the bearings.

Other objects, features and advantages of my invention are set forth in the following description wherein reference is made to the accompanying drawings in which—

Figure 1 is a back view of a radiator shutter apparatus embodying my invention, certain parts thereof being broken into section;

Figure 2 is a transverse vertical section taken on the line 2—2 of Figure 1; and Figure 3 is a transverse section of one of the journal units for a shutter, this view being taken on the line 3—3 of Figure 1.

The apparatus herein shown, like that shown and described in the Raleigh patent previously mentioned, is of the type comprising two principal frames, namely, a shell or main frame, and a sub-frame which is secured in the shell and which supports the shutters and, if desired, all or a part of the shutter operating mechanism.

In the accompanying drawings I have illustrated at 10 a radiator attachment shell which is or may be identical with the shell shown and described in the aforesaid Raleigh patent, at 11 the cushioning strand which is interposed between the front face of the radiator 12 and the marginal flange 13 of the shell, at 14 the rectangular fenestration in the forwardly dished central portion of the shell and at 15 the shutters carried by the shutter frame 16.

Each shutter 15 extends horizontally across the fenestration 14 and is pivoted about an axis midway of its width, the upper edge of each shutter being bent to form a channel edge 17 which, when the shutters are closed, embraces a flange 18 at the lower edge of the shutter immediately above to provide a relatively air-tight closure for the fenestration. I prefer to attach the shell 10 to the radiator by long slender bolts (not shown) of the type illustrated in the aforesaid Raleigh patent.

The frame 16 comprises an upper channel member 19 and a lower channel member 20, the webs of these channels facing toward each other and being disposed approximately at the upper and lower edges of the fenestration 14. Each side of the frame 16 is formed by a channel member 21 extending along one of the lateral edges of the fenestration 14 and is secured at its upper end to the channel member 19 by a projection 19' bent downwardly from the web of the channel 19 and to the bottom channel 20 by a similar upwardly bent projection 20'. Spacers 22 are preferably provided between the flanges of the channel members where the projections 19' and 20' are secured. The frame 16 may be secured in the shell in any suitable manner as, for instance, by the frame retaining clips shown in the aforesaid Raleigh patent.

As shown in the detail section of Figure 3, each channel member 21 is disposed with its open side resting directly against the shell metal at the lateral margins of the fenestration 14, the open sides of these channels being thus closed against ingress of foreign matter. The projections 19' and 20' pass across the open ends of the channel members 21, and, aided by the spacers 22, form end closures for the channel members. The open sides and ends of the channel members being thus closed, there are formed in effect a pair of long closed chambers encasing the shutter bearings now to be described.

Each shutter 15 at its ends is provided with upwardly bent portions 23. Each of these portions is provided with a transverse hole 24 in which a rotatable bearing member 25 is rigidly secured. At the right ends of the shutters (Fig. 1) the portions 23 are extended to form arms 26 which are pivoted to the actuating link 27 which normally tends to close the shutters under the force of a tension spring 28, but which may be moved to open the shutters by a rod 29 pivoted to one end of a bell crank 30 which is actuated by a thermostat, not shown, mounted in a housing 31 supported from the upper channel member 19 of the frame.

A description of one of the shutter bearings will suffice for all. Again referring to Figure 3, it will be noted that each rotatable bearing member 25 extends through a hole 32 in the adjacent lateral flange of the contiguous channel member 21, each hole 32 being provided with an inwardly flanged margin. The outer flange of the channel member 21 is provided with a hole 34 directly opposite the hole 32, and a stationary bearing member 35 is rigidly secured to the channel member 21 by means of this hole. The stationary bearing member 35 is provided at its inner end with a trunnion portion 35ᵃ leaving a shoulder 35ᵇ while the rotatable bearing member 25 is provided with an end bore 25', into which the trunnion 25ᵃ extends to form a bearing surface for the journal and similarly to serve as a centering means to keep the axis of its shutter parallel with the axes of the other shutters. End thrust on the shutter is taken by the shoulder 35ᵇ and the juxtaposed end of the bearing member 25. I prefer that the flanged margins of the hole 32 fit rather snugly about the bearing member 25 and close to the shoulder or bead 33 thereof, whereby dust and particles of dirt may be excluded from the closed interior of the channel member 21. In this way foreign matter is kept from entering between the relatively moving bearing surfaces.

Another feature of the bearing construction just described is its simplicity of manufacture. The holes 32 and 34 may be formed in the channel members in one operation, and the stationary bearing members 35 inserted in the holes 34 and peened over to secure them to the channel members. The rotatable bearing members 25 may similarly be set in the holes 24 at the ends of the shutters and then be peened over.

Having thus described a preferred embodiment of my invention, I claim:

1. The combination in an apparatus of the class described, shutters, a frame therefor comprising a hollow closed dust excluding member, and bearing members for said shutters supported by said dust excluding member, the bearing joints between the relatively moving bearing surfaces of said bearing members communicating with the interior of said hollow dust excluding member.

2. In a shutter apparatus for radiators the combination of a plurality of shutters, a frame therefor comprising spaced channel members, closures for the ends and open sides of said channel members, and bearing members for mounting said shutters in said channel members, the bearing joint between the relatively moving bearing surfaces of each bearing member communicating with the closed interior of its respective channel member.

3. A shutter apparatus comprising a shell having a fenestration, spaced channel members disposed with their open sides against said shell for excluding dust and dirt, a plurality of shutters for closing said fenestration mounted between said channel members, and bearing members for journalling said shutters on said channel members, said bearing members being supported within said channel members.

4. In a shutter apparatus the combination of a shell constituting a frame therefor and having a fenestration, a sub-frame secured to one side of said shell, said sub-frame comprising a pair of spaced channel members disposed with their open sides against said portion and adjacent said fenestration, a plurality of shutters mounted between said channel members for closing said fenestration, and bearing members within said channel members for journalling said shutters in said sub-frame.

5. In a shutter apparatus for radiators the combination of a pair of spaced channel members disposed with a side flange of one toward a side flange of the other, a plurality of shutters mounted between said channel members, and bearing means for pivoting said shutters on said frames about spaced axes extending transversely of said channel members, each of said bearing means comprising a rotatable bearing member secured to a respective shutter, a hole in the adjacent side flange of one of said channel members, through which hole said bearing member extends, and a stationary bearing member secured to the other side flange of said channel member and facing said rotatable bearing member, an end of one of said bearing members being provided with a trunnion and the adjacent end of the other of said bearing members with a bore into which said trunnion extends to form a journal for the respective shutter, said rotary bearing members and the margins of said holes co-operating to exclude dust from said journals.

6. In a shutter apparatus for radiators the combination of a pair of spaced channel members disposed with a lateral flange of one toward the lateral flange of the other, a plurality of shutters mounted between and pivoted on said channel members about spaced axes extending transversely of said channel members, closures for the ends and open sides of said channel members, and bearing means for effecting such pivoting comprising rotatable bearing members secured to said shutters, holes in the adjacent side flanges of said frames through which holes said rotating bearing members extend, and stationary bearing members secured to the distant side flanges of said channel members and extending toward said rotatable bearing members, the adjacent ends of said bearing members being provided with co-operating trunnions and bores to form journals for said shutters.

7. In a shutter apparatus for radiators the combination of a pair of spaced channel members disposed with a side flange of one toward a side flange of the other, a plurality of shutters mounted between said channel members, bearing means for pivoting said shutters on said channel members about spaced axes, said bearing means comprising rotatable bearing members secured to respective shutters and holes in the adjacent side flanges of said channel members, through which holes said rotating bearing members extend, shoulders on said rotary bearing members co-operating with said side flanges for excluding dust from the interior of said channel members, and second bearing members secured to the distant side flanges of said channel members and extending toward said rotatable bearing members, the adjacent ends of said members being provided with the trunnions and bores into which said trunnions extend to form journals for the shutters, and closures for the open sides of said channel members for the purpose of excluding dust from said journals.

8. The combination of a shell adapted to fit over the face of a radiator, a channel member, the open side of which is placed against said shell and is closed thereby, a plurality of shutters having spaced pivotal mounting on said channel member, each such mounting comprising a hole in the flange of said member adjacent the respective shutter, a rotary bearing member secured to the respective shutter and passing through said hole, a stationary bearing member secured to the outer flange of said channel member and in alignment with said hole, and co-operating journalling and end thrust bearing means on the adjacent ends of said stationary and rotary members.

9. The combination of a shell adapted to fit over the face of a radiator, a channel member, the open side of which is placed against said shell and is closed thereby, a plurality of shutters having pivotal mounting on said channel member, each such mounting comprising a hole in the flange of said member adjacent the respective shutter, a rotary bearing member secured to the respective shutter and passing through said hole, said bearing member co-operating with the margins of said hole to exclude dust from the interior of said channel member, and journalling means between the outer end of said rotatable member and the outer flange of said channel member.

10. The combination in an apparatus of the class described, shutters, bearings for said shutters, and a hollow enclosing member enclosing the bearings for a plurality of said shutters, said hollow enclosing member excluding dust and dirt from said bearings.

11. In a shutter apparatus for radiators, the combination of a plurality of shutters, bearings for said shutters comprising a movable bearing member and a stationary bearing member having an external bearing joint between said members, and an enclosing member completely surrounding the external bearing joints of a plurality of said bearings for preventing the entrance of dust or dirt to said bearing joints.

12. The combination in an apparatus of the class described, of a frame comprising a pair of channels disposed with a side flange of one toward a side flange of the other, a plurality of shutters mounted between said channels, bearings for said shutters, each comprising a stationary bearing member mounted on the channel and a movable bearing member extending from the shutter through an opening in the adjacent wall of said channel, the external bearing joint between said bearing members being disposed in said channel between the side flanges thereof.

13. In a shutter apparatus for radiators, the combination of a frame comprising a pair of channels disposed with a side flange of one toward a side flange of the other, a pair of cross members connecting said channels, tongues projecting from said cross members, screws passing through said tongues and the lateral flanges of said channels, spacers between the lateral flanges of said channels adjacent said screws, and shutters pivotally supported by said channels.

In witness whereof, I hereunto subscribe my name this 29 day of December, 1923.

CHRISTIAN NIELSEN, Jr.

Witnesses:
L. E. NOBERT,
CHAS. A. PIFENHAGEN.